United States Patent
Chen et al.

(10) Patent No.: US 10,567,172 B2
(45) Date of Patent: Feb. 18, 2020

(54) METHOD FOR UPDATING A KEY, AND MASTER TRANSMISSION POINT

(71) Applicant: ZTE Corporation, Shenzhen (CN)

(72) Inventors: Lin Chen, Shenzhen (CN); Fang Zhang, Shenzhen (CN); Yufeng Ruan, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 228 days.

(21) Appl. No.: 15/526,805

(22) PCT Filed: Apr. 27, 2015

(86) PCT No.: PCT/CN2015/077540
§ 371 (c)(1),
(2) Date: May 15, 2017

(87) PCT Pub. No.: WO2016/074444
PCT Pub. Date: May 19, 2016

(65) Prior Publication Data
US 2017/0331625 A1 Nov. 16, 2017

(30) Foreign Application Priority Data
Nov. 13, 2014 (CN) .......................... 2014 1 0642077

(51) Int. Cl.
*H04L 29/06* (2006.01)
*H04L 9/08* (2006.01)
*H04W 12/04* (2009.01)

(52) U.S. Cl.
CPC ........ *H04L 9/0891* (2013.01); *H04L 63/0428* (2013.01); *H04W 12/04* (2013.01)

(58) Field of Classification Search
CPC ..... H04L 63/04; H04L 63/0428; H04L 63/12; H04W 12/04; H04W 12/10
See application file for complete search history.

(56) References Cited

U.S. PATENT DOCUMENTS

| | | | | |
|---|---|---|---|---|
| 2013/0315389 A1* | 11/2013 | Jung | ...................... | H04L 63/065 380/31 |
| 2014/0093082 A1* | 4/2014 | Jung | ...................... | H04L 63/104 380/270 |

FOREIGN PATENT DOCUMENTS

| | | | | |
|---|---|---|---|---|
| CN | 101257723 A | 9/2008 | | |
| CN | 101299888 A | 11/2008 | | |
| CN | 102056160 A | 5/2011 | | |
| CN | 102215485 A | 10/2011 | | |
| WO | WO2011/054286 A1 * | 3/2009 | ............ | H04W 12/04 |

OTHER PUBLICATIONS

International Search Report for corresponding application No. PCT/CN2015/077540 filed on Apr. 27, 2015; dated Aug. 25, 2015.

* cited by examiner

*Primary Examiner* — Dao Q Ho
(74) *Attorney, Agent, or Firm* — Cantor Colburn LLP

(57) ABSTRACT

Disclosed are a key updating method and device, and a master Transmission Point (TP). The method includes: receiving a key parameter for generating a data encryption key of a TP in a virtual cell (S102); and generating the data encryption key of the TP in the virtual cell according to the key parameter and a cell Identity (ID) of the virtual cell (S104). By means of the key updating method and device and the master TP, the problem about key updating of different TPs in a virtual cell is solved.

10 Claims, 7 Drawing Sheets

METHOD FOR UPDATING A KEY, AND MASTER TRANSMISSION POINT

TECHNICAL FIELD

The present invention relates to the field of mobile communications, and more particularly to a method and device for updating a key, and a master Transmission Point (TP).

BACKGROUND

With the development of a mobile communication technology, it is imperative to achieve the purpose of a 5 Generation (5G) mobile communication technology. The 5G technology involves mobile data traffic increase for 1000 times per region, throughput increase for 10 to 100 times per user, increase of number of connecting devices for 10 to 100 times, prolonging of battery life of a low-power device for 10 times and decrease of an end-to-end delay for 5 times, so some new radio technology solutions must be proposed in 5G. Herein, Ultra-Dense Networks (UDNs) are important means for achieving first two indexes of 5G. A key technology for the UDNs is to enable a great number of points to effectively co-exist within a dense range in a homogeneous or heterogeneous manner. In order to solve the problem of frequent switching of User Equipments (UEs) under an UDN scenario, in the conventional art, a solution for a virtual cell is proposed in a 5G research, a construction mode for the virtual cell being divided into a centralized mode and a distributed mode. Under a working pattern of the virtual cell, services of the UE may be borne on different TPs in the virtual cell at different periods of time. Different data packets borne by the same virtual cell may be transmitted over different TPs in the virtual cell respectively, and the data packets need to be encrypted at an air interface. However, the encryption complexity of the UE is higher, and in order to reduce the implementation complexity of the UE end and avoid from simultaneous maintenance of a plurality of sets of key security contexts at the UE end, keys used by different TPs in the virtual cell need to be unified. Therefore, the problem about key updating of different TPs in a virtual cell under an UDN scenario needs to be solved urgently.

At present, any effective solution has not been proposed yet for the problem in the conventional art about key updating of different TPs in the virtual cell under the UDN scenario.

SUMMARY

The present invention provides a method and device for updating a key, and a master TP, intended to at least solve the problem in the conventional art about key updating of different TPs in a virtual cell under an UDN scenario.

According to an aspect of the embodiment of the present invention, a method for updating a key is provided, which may include: receiving a key parameter for generating a data encryption key of a TP in a virtual cell; and generating the data encryption key of the TP in the virtual cell according to the key parameter and a cell Identity (ID) of the virtual cell.

In certain embodiments, generating the data encryption key of the TP in the virtual cell according to the key parameter and a cell ID of the virtual cell may include: selecting a predetermined encryption algorithm; generating a first key of a master TP in the virtual cell according to the key parameter and the cell ID of the virtual cell; and sending the predetermined encryption algorithm and the first key to a slave TP, wherein the predetermined encryption algorithm and the first key are used for generating data encryption keys of the master TP and the slave TP.

In certain embodiments, after the data encryption key of the TP in the virtual cell is generated according to the key parameter and the cell ID of the virtual cell, the method may further include: receiving a key updating completion signal from the slave TP; and sending a Radio Resource Control (RRC) connecting reconfiguration message to a UE, wherein the RRC connecting reconfiguration message carries information for generating the data encryption key of the TP in the virtual cell.

Alternatively, the key parameter for generating the key of the TP in the virtual cell may be received by satisfying one of the following trigger conditions: receiving an updating signal from a core network, wherein the updating signal carries the key parameter; receiving a reusability signal of a Data Radio Bearer-Identity (DRB-ID) from the core network; and receiving a turning signal of a Packet Data Convergence Protocol Sequence Number (PDCPSN) from the TP.

In certain embodiments, any one of the above methods may further include: transmitting data according to the data encryption key.

According to another aspect of the embodiment of the present invention, a device for updating a key is provided, which may include: a first receiving module, configured to receive a key parameter for generating a data encryption key of a TP in a virtual cell; and a generation module, configured to generate the data encryption key of the TP in the virtual cell according to the key parameter and a cell ID of the virtual cell.

In certain embodiments, the generation module may include: a selection unit, configured to select a predetermined encryption algorithm; a generation unit, configured to generate a first key of a master TP in the virtual cell according to the key parameter and the cell ID of the virtual cell; and a sending unit, configured to send the predetermined encryption algorithm and the first key to a slave TP, wherein the predetermined encryption algorithm and the first key are used for generating data encryption keys of the master TP and the slave TP.

In certain embodiments, the device may further include: a second receiving module, configured to receive a key updating completion signal from the slave TP; and a sending module, configured to send an RRC connecting reconfiguration message to a UE, wherein the RRC connecting reconfiguration message carries information for generating the data encryption key of the TP in the virtual cell.

Alternatively, the first receiving module may be further configured to receive the key parameter for generating the key of the TP in the virtual cell by satisfying one of the following trigger conditions: receiving an updating signal from a core network, wherein the updating signal carries the key parameter; receiving a reusability signal of a DRB-ID from the core network; and receiving a turning signal of a PDCPSN from the TP.

In certain embodiments, any one of the above devices may further include: a data transmission module, configured to transmit data according to the data encryption key.

According to a further aspect of the embodiment of the present invention, a master TP is provided, which may include any one of the preferable devices.

By means of the embodiment of the present invention, a key parameter for generating a data encryption key of a TP in a virtual cell is received; and the data encryption key of the TP in the virtual cell is generated according to the key parameter and a cell ID of the virtual cell. The problem about key updating of different TPs in a virtual cell under an UDN scenario is solved.

BRIEF DESCRIPTION OF THE DRAWINGS

The drawings illustrated herein are intended to provide a further understanding for the present invention, and form a part of the present application. The schematic embodiments and illustrations of the present invention are intended to explain the present invention, and do not form improper limits to the present invention. In the drawings.

DETAILED DESCRIPTION OF THE EMBODIMENTS

The present invention will be illustrated hereinbelow with reference to the drawings and in conjunction with the embodiments in detail. It is important to note that embodiments in the present application and features in the embodiments may be combined under the condition of no conflicts.

Figure 1:
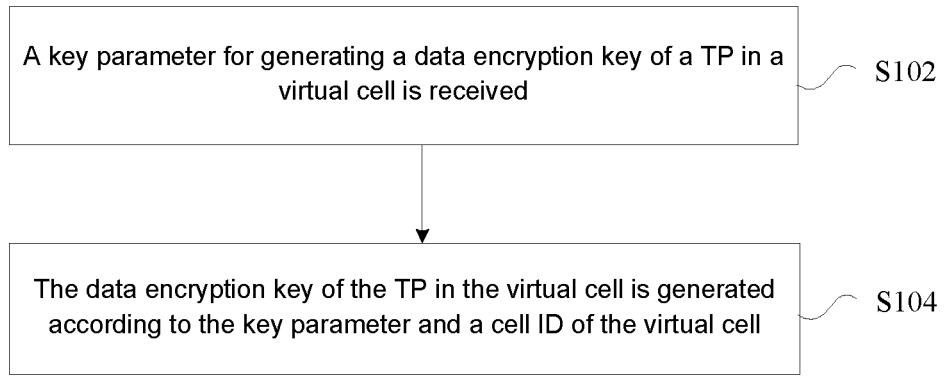
FIG. 1 is a flowchart of a method for updating a key according to an embodiment of the present invention.

In the present embodiment, a method for updating a key is provided. FIG. 1 is a flowchart of a method for updating a key according to an embodiment of the present invention. As shown in FIG. 1, the flow includes the steps as follows.

Step S102: A key parameter for generating a data encryption key of a TP in a virtual cell is received.

Step S104: The data encryption key of the TP in the virtual cell is generated according to the key parameter and a cell ID of the virtual cell.

By means of the above-mentioned steps, the key parameter is received, and the data encryption key of the TP in the virtual cell is generated according to the key parameter and the cell ID of the virtual cell, so the problem about key updating of different TPs in a virtual cell is solved, and the implementation complexity of a UE end encryption/decryption processing flow is reduced.

In certain embodiments, generating the data encryption key of the TP in the virtual cell according to the key parameter and a cell ID of the virtual cell includes: selecting a predetermined encryption algorithm; generating a first key of a master TP in the virtual cell according to the key parameter and the cell ID of the virtual cell; and sending the predetermined encryption algorithm and the first key to a slave TP, wherein the predetermined encryption algorithm and the first key are used for generating data encryption keys of the master TP and the slave TP. By taking the ID of the virtual cell as the parameter for generating the key of the TP, the timeliness of key updating of the TP is ensured.

The first key of the master TP and the predetermined encryption algorithm are sent to the slave TP. An encryption algorithm ID is selected by a master controller/master TP (CC/Master TP), and signaling interaction overheads caused by selection of an encryption algorithm from the slave TP may be reduced.

In certain embodiments, after the data encryption key of the TP in the virtual cell is generated according to the key parameter and the cell ID of the virtual cell, the method further includes: receiving a key updating completion signal from the slave TP; and sending an RRC connecting reconfiguration message to a UE, wherein the RRC connecting reconfiguration message carries information for generating the data encryption key of the TP in the virtual cell. The UE is informed of key updating through the RRC connecting reconfiguration message, and does not need to perform signaling interaction with a core network; and moreover, compared with a Small Cell Counter (SCC) release/addition process, service interruption delays are greatly shortened.

Alternatively, the key parameter for generating the key of the TP in the virtual cell is received by satisfying one of the following trigger conditions: receiving an updating signal from a core network, wherein the updating signal carries the key parameter; receiving a reusability signal of a DRB-ID from the core network; and receiving a turning signal of a PDCPSN from the TP.

Due to key unification of the CC/Master TP and each slave TP in the virtual cell, the UE only needs to keep a key for each radio bearer, thus reducing the implementation complexity of the UE end encryption/decryption processing flow.

In certain embodiments, any one of the above methods further includes: transmitting data according to the data encryption key. By means of the unified data encryption key, during data transmission over the master TP and the slave TP, the unified data encryption key is generated by using the same first key and the predetermined encryption algorithm through a Key Derivation Function (KDF), thus achieving the effect of unification of data encryption keys.

In the present embodiment, a device for updating a key is also provided. The device is configured to implement the above-mentioned embodiment and a preferable implementation mode. Those which have been illustrated will not be elaborated herein. Just as a term 'module' used below, the combination of software and/or hardware with predetermined functions may be implemented. Although the device described by the following embodiment is better implemented by software, the implementation of hardware or the combination of software and hardware may be possible and conceived.

Figure 2:
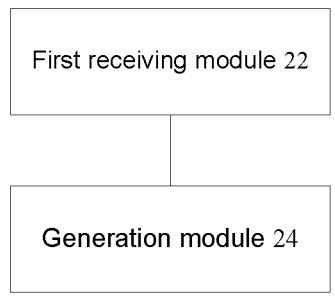
FIG. 2 is a block diagram of a device for updating a key according to an embodiment of the present invention.

FIG. 2 is a block diagram of a device for updating a key according to an embodiment of the present invention. As shown in FIG. 2, the device includes: a first receiving module 22 and a generation module 24. The device will be illustrated below.

The first receiving module 22 is configured to receive a key parameter for generating a data encryption key of a TP in a virtual cell; and the generation module 24 is connected to the first receiving module 22, and is configured to generate the data encryption key of the TP in the virtual cell according to the key parameter and a cell ID of the virtual cell.

By means of the above-mentioned device, the first receiving module 22 is configured to receive the key parameter for generating the data encryption key of the TP in the virtual cell, and the generation module 24 is configured to generate the data encryption key of the TP in the virtual cell according to the key parameter and the cell ID of the virtual cell, so the problem about key updating of different TPs in a virtual cell is solved, and the implementation complexity of a UE end encryption/decryption processing flow is reduced.

Figure 3:
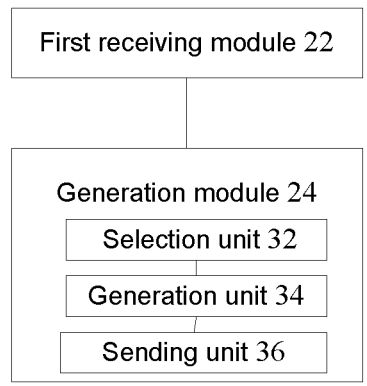
FIG. 3 is a preferable block diagram 1 of a device for updating a key according to a preferable embodiment of the present invention.

FIG. 3 is a preferable block diagram of a generation module 24 in a device for updating a key according to an embodiment of the present invention. As shown in FIG. 3, the generation module 24 includes: a selection unit 32, a generation unit 34 and a sending unit 36. The generation module 24 will be illustrated below.

The selection unit 32 is configured to select a predetermined encryption algorithm; the generation unit 34 is connected to the selection unit 32, and is configured to generate a first key of a master TP in the virtual cell according to the key parameter and the cell ID of the virtual cell; and the sending unit 36 is connected to the selection unit 32, and is configured to send the predetermined encryption algorithm and the first key to a slave TP, wherein the predetermined encryption algorithm and the first key are used for generating data encryption keys of the master TP and the slave TP. By taking the ID of the virtual cell as the parameter for generating the key of the TP, the timeliness of key updating of the TP is ensured.

The first key of the master TP and the predetermined encryption algorithm are sent to the slave TP. An encryption algorithm ID is selected by a CC/Master TP, and signaling interaction overheads caused by selection of an encryption algorithm from the slave TP may be reduced.

Figure 4:
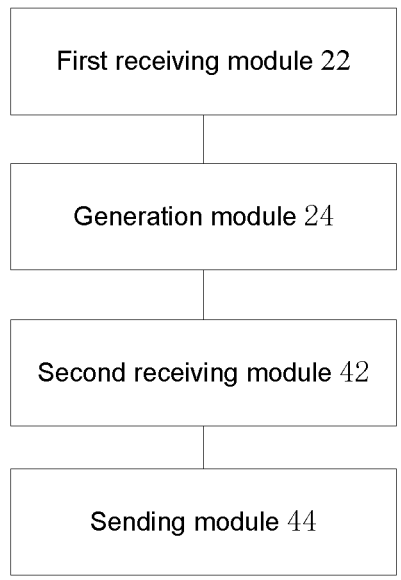
FIG. 4 is a preferable block diagram 2 of a device for updating a key according to a preferable embodiment of the present invention.

FIG. 4 is a preferable block diagram of a device for updating a key according to an embodiment of the present invention. As shown in FIG. 4, the device further includes, in addition to all the modules shown in FIG. 2, a second receiving module 42 and a sending module 44. The device will be illustrated below.

The second receiving module 42 is connected to the generation module 24, and is configured to receive a key updating completion signal from the slave TP; and the sending module 44 is connected to the second receiving module 42, and is configured to send an RRC connecting reconfiguration message to a UE, wherein the RRC connecting reconfiguration message carries information for generating the data encryption key of the TP in the virtual cell. The UE is informed of key updating through the RRC connecting reconfiguration message, and does not need to perform signaling interaction with a core network; and moreover, compared with an SCC release/addition process, service interruption delays are greatly shortened.

In certain embodiments, the first receiving module 22 is further configured to receive the key parameter for generating the key of the TP in the virtual cell by satisfying one of the following trigger conditions: receiving an updating signal from a core network, wherein the updating signal carries the key parameter; receiving a reusability signal of a DRB-ID from the core network; and receiving a turning signal of a PDCPSN from the TP.

Figure 5:
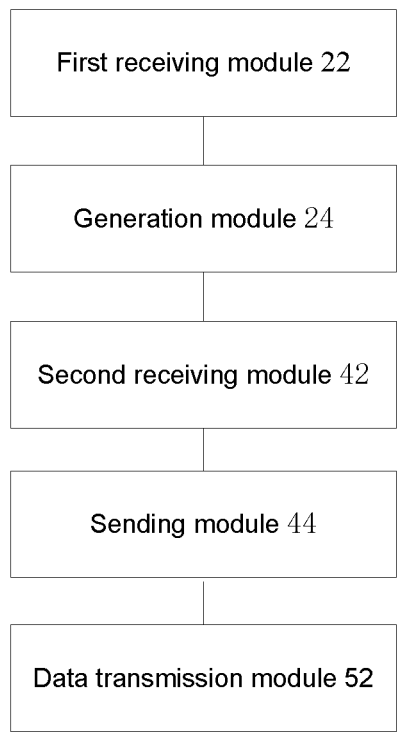
FIG. 5 is a preferable block diagram 3 of a device for updating a key according to a preferable embodiment of the present invention.

FIG. 5 is a preferable block diagram of a device for updating a key according to an embodiment of the present invention. As shown in FIG. 5, the device further includes, in addition to all the modules shown in FIG. 4, a data transmission module 52. The device will be illustrated below.

The data transmission module 52 is configured to transmit data according to the data encryption key. By means of the unified data encryption key, during data transmission over the master TP and the slave TP, the unified data encryption key is generated by using the same first key and the predetermined encryption algorithm through a KDF, thus achieving the effect of unification of data encryption keys.

Due to key unification of the CC/Master TP and each slave TP in the virtual cell, the UE only needs to keep a key for each radio bearer, thus reducing the implementation complexity of the UE end encryption/decryption processing flow.

Figure 6:
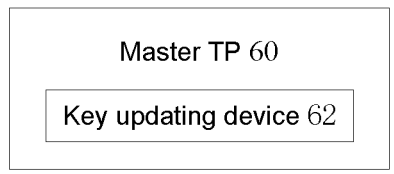
FIG. 6 is a block diagram of a master TP according to an embodiment of the present invention.

FIG. 6 is a block diagram of a master TP according to an embodiment of the present invention. As shown in FIG. 6, the master TP 60 includes any one of the device for updating a keys 62.

As for the above-mentioned problem in the related art, in the present embodiment, a method for generating and transferring a key of a virtual cell is provided. The method will be briefly illustrated below. The method includes the steps as follows.

(1) When a CC/Master TP side receives an updating indication of a core network KeNB (equivalent to the above-mentioned key parameter functionally), and learns of that a DRB-ID needs to be reused and a PDCP SN of a Slave TP side is turned, an updating process for a TP key TP-KeNB is triggered.

(2) If the CC/Master TP side triggers a security key updating process, the CC/Master TP generates a new TP key TP-KeNB through a KDF according to a latest KeNB, a current SCC value and an ID of the virtual cell.

(3) If a security key updating request message of the Slave TP is received, the CC/Master TP generates a new TP key TP-KeNB through the KDF according to a current KeNB value, an SCC+1 and the ID of the virtual cell.

(4) The CC/Master TP informs all Slave TPs of key TP-KeNB updating through a security key updating command message, the message further including a selected encryption algorithm ID; and the Slave TP generates a new encryption key $K_{UPenc}$ (equivalent to the above-mentioned slave TP key) through the KDF according to the latest KeNB and a selected security algorithm.

(5) After receiving security key command acknowledgment messages of all the Slave TPs, the CC/Master TP informs a UE of key updating through RRC connecting reconfiguration information, the RRC connecting reconfiguration information including the current SCC value, the selected security algorithm and the ID of the virtual cell.

(6) The UE calculates the TP-KeNB according to the latest KeNB value, the current SCC value and the ID of the virtual cell obtained from the core network, and then generates a new encryption key $K_{UPenc}$ through the KDF according to the latest KeNB and the selected security algorithm.

(7) The UE informs the CC/Master TP of key updating process completion through an RRC connecting reconfiguration message.

(8) The CC/Master TP informs all the Slave TPs of security key updating process completion through a security key updating acknowledgment message.

Wherein, a TP key TP-KeNB is independently generated for each radio bearer DRB-ID of each UE; and a PDCP SN cannot be repeated for an identical TP key and an identical DRB-ID.

Wherein, when the CC/Master TP generates the TP key, input parameters including, in addition to the key KeNB and the current SCC value obtained from the core network, the ID of the virtual cell, thus providing guarantee for timely key updating of a TP under an UDN scenario.

Wherein, an encryption algorithm ID for generating an encryption key is uniformly selected by the CC/Master TP, and signaling interaction overheads caused by selection of an encryption algorithm from the Slave TP may be reduced.

Wherein, TP keys of all the Slave TPs may be updated simultaneously, thus ensuring that the TP keys used by all the Slave TPs and the UE keep consistent.

Wherein, all members in the virtual cell, including the CC/Master TP and each Slave TP, have independent PDCP layers, and use the same encryption key.

Wherein, the TP key is updated in an RRC connecting reconfiguration process, and there is no signaling interaction with the core network. Moreover, compared with an SCC release/addition process, service interruption delays are greatly shortened, and the user experience may be improved.

By means of the above-mentioned embodiment and the preferable implementation mode, by taking the ID of the virtual cell as the parameter for generating the TP key, the timeliness of key updating of the TP is ensured. The encryption algorithm ID is selected by the CC/Master TP, so signaling interaction overheads caused by selection of the encryption algorithm from the Slave TP may be reduced. The UE is informed of key updating through the RRC connecting reconfiguration message, and does not need to perform signaling interaction with the core network; and moreover, compared with the SCC release/addition process, the service interruption delays are greatly shortened. Due to key unification of the CC/Master TP and each slave TP in the virtual cell, the UE only needs to keep a key for each radio bearer, thus reducing the implementation complexity of the UE end encryption/decryption processing flow.

The preferable implementation mode of the present invention will be illustrated below.

Figure 7:
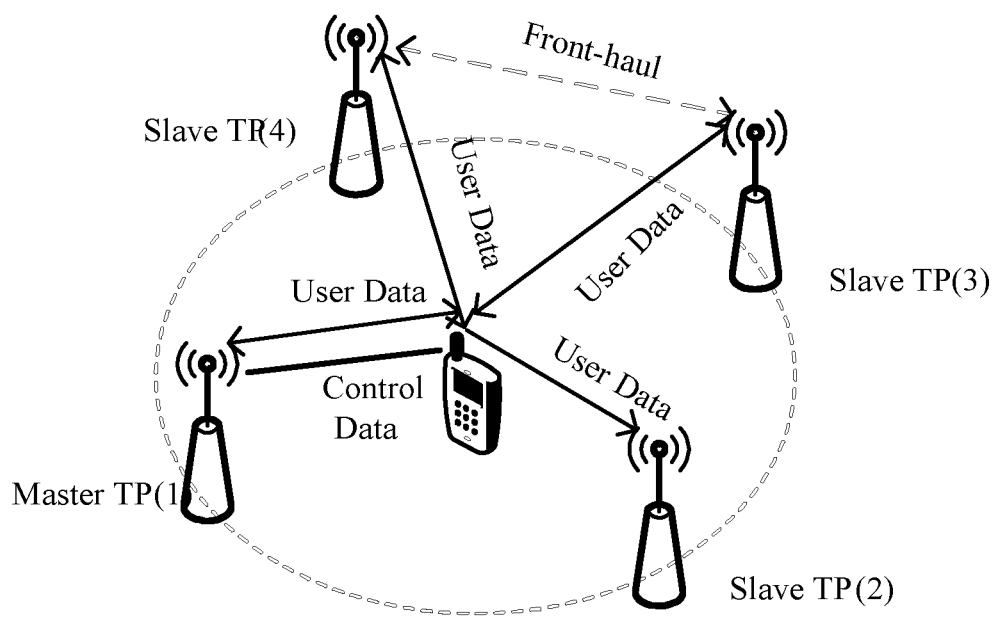
FIG. 7 is a structural diagram of distributed virtual cell networking according to an embodiment of the present invention.

FIG. 7 is a structural diagram of distributed virtual cell networking according to a preferable implementation mode of the present invention. As shown in FIG. 7, TP1, TP2, TP3 and TP4 constitute a virtual cell, each TP having an independent PDCP layer, wherein TP1 is a Master TP of the virtual cell, and other TPs are Slave TPs of the virtual cell. The Master TP is a high-layer control anchor point, generating all high-layer control signaling, executing allocation of all scheduling and radio resource allocation, managing key updating of the Slave TPs and solving conflicts in a resource allocation process; and the Slave TPs are used for coordinated data transmission according to an instruction of the Master TP. The TPs are connected with a core network through a cable Backhaul interface, and coordination between the TPs is realized through a radio Fronthaul interaction control signaling. All base stations in the virtual cell share information such as a user identifier, an authentication/authorization key, an L2 connecting identifier and a necessary service context. The Master TP takes charge of processing control plane and user plane data of a user, and the Slave TPs only take charge of processing a data plane of the user.

Figure 8:
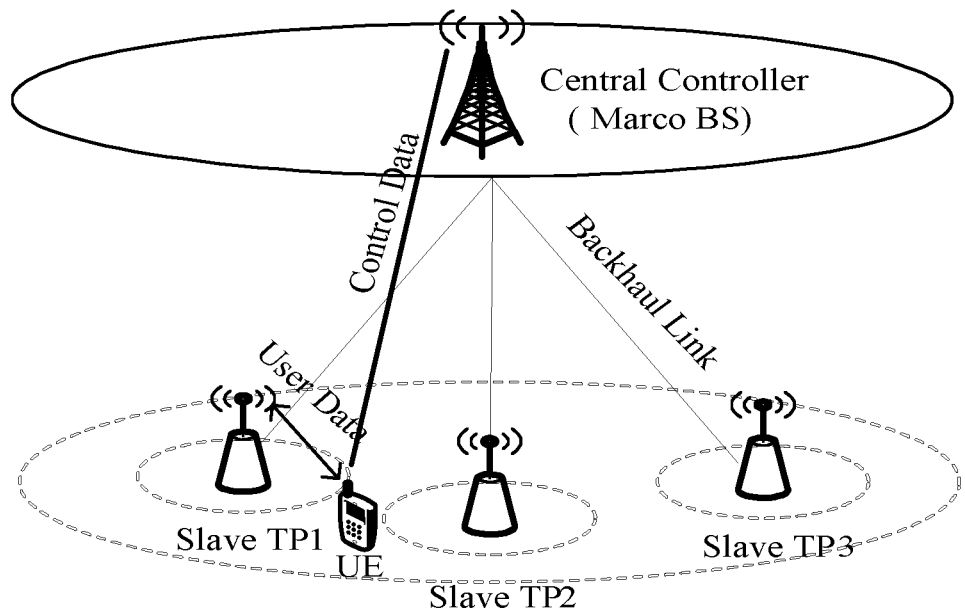
FIG. 8 is a structural diagram of centralized virtual cell networking according to an embodiment of the present invention.

FIG. 8 is a structural diagram of centralized virtual cell networking according to a preferable implementation mode of the present invention. As shown in FIG. 8, during centralized virtual cell networking, a centralized virtual cell has a central controller, is a logic node and may be implemented, in the presence of a macro station, in the macro station usually. The central controller takes charge of processing control plane data, the Slave TPs take charge of processing user plane data, and each Slave TP is connected with the central controller through a Backhaul link. The central controller uniformly takes charge of scheduling and allocating resources of each Slave TP, updating a security key, etc.

Figure 9:
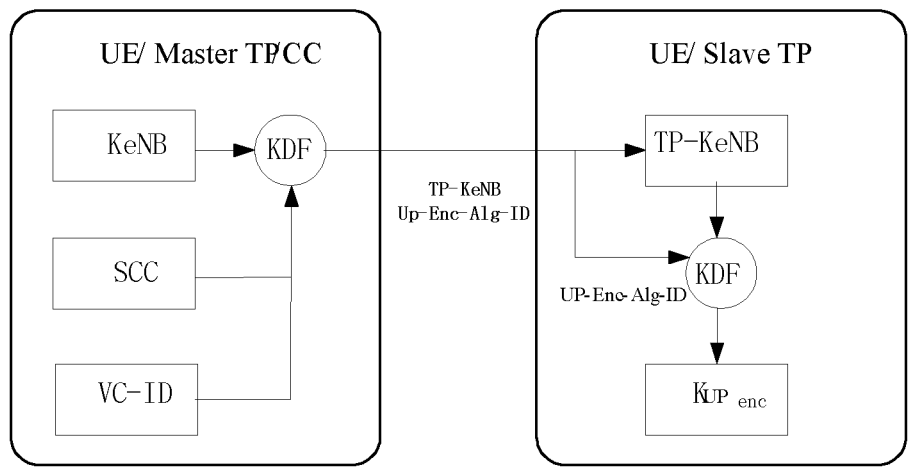
FIG. 9 is a flowchart of a method for updating a key according to a preferable implementation mode 1 of the present invention.

FIG. 9 is a flowchart of a method for updating a key according to a preferable implementation mode 1 of the present invention. As shown in FIG. 9, a frame diagram of generating a virtual cell TP key TP-KeNB and an encryption key $K_{UPenc}$ is as shown in FIG. 9. A Master TP/CC inputs a KDF to generate a TP key TP-KeNB according to a key KeNB, a current SCC value and an ID of a virtual cell VC-ID obtained from a core network. After calculation is completed, the Master TP/CC informs each Slave TP of the TP key TP-KeNB and a selected encryption algorithm, and the Slave TP calculates the encryption key $K_{UPenc}$ according to the TP-KeNB and the encryption algorithm. After the above process is ended, the Master TP/CC informs a UE of the current SCC value, the encryption algorithm and the ID of the virtual cell VC-ID, to allow the UE to calculate the TP key TP-KeNB and the encryption key $K_{UPenc}$.

Figure 10:
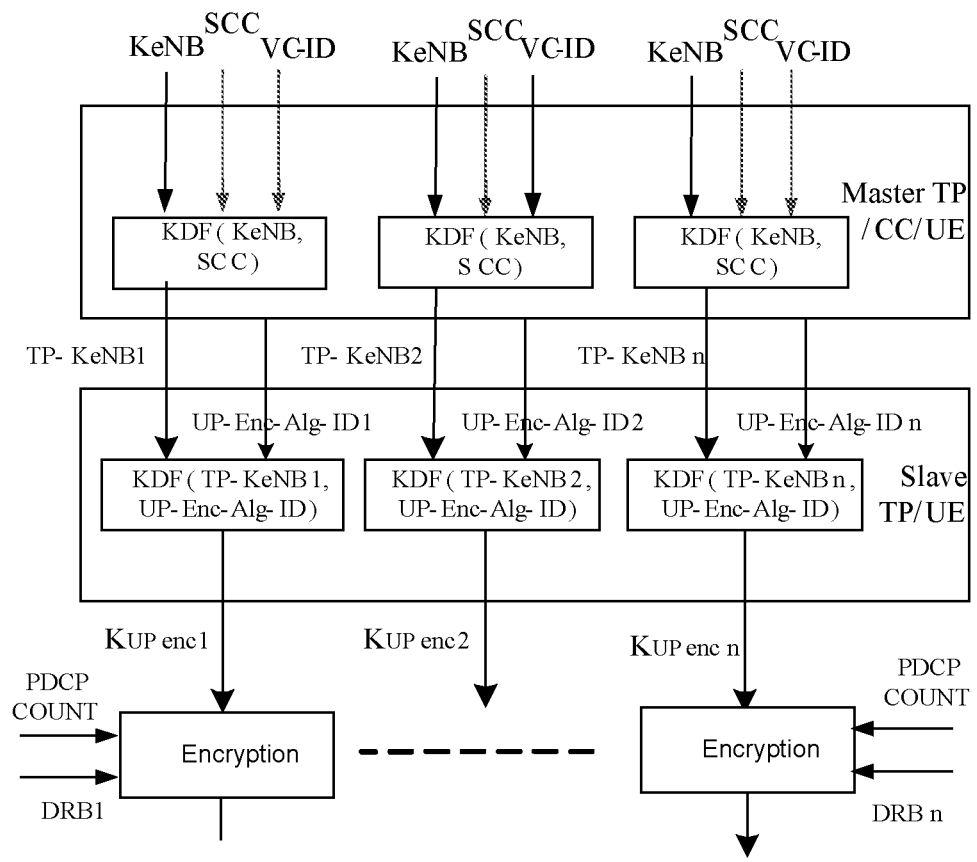
FIG. 10 is a flowchart of a method for updating a key according to a preferable implementation mode 2 of the present invention.

FIG. 10 is a flowchart of a method for updating a key according to a preferable implementation mode 2 of the present invention. As shown in FIG. 10, a respective working diagram for different radio bearer DRB-IDs of an identical UE, a Master TP/CC, Slave TPs and the UE is given. In the figure, a process for finally generating different encryption keys $K_{UPenc}$ for different DRB-IDs of the identical UE is given.

Figure 11:
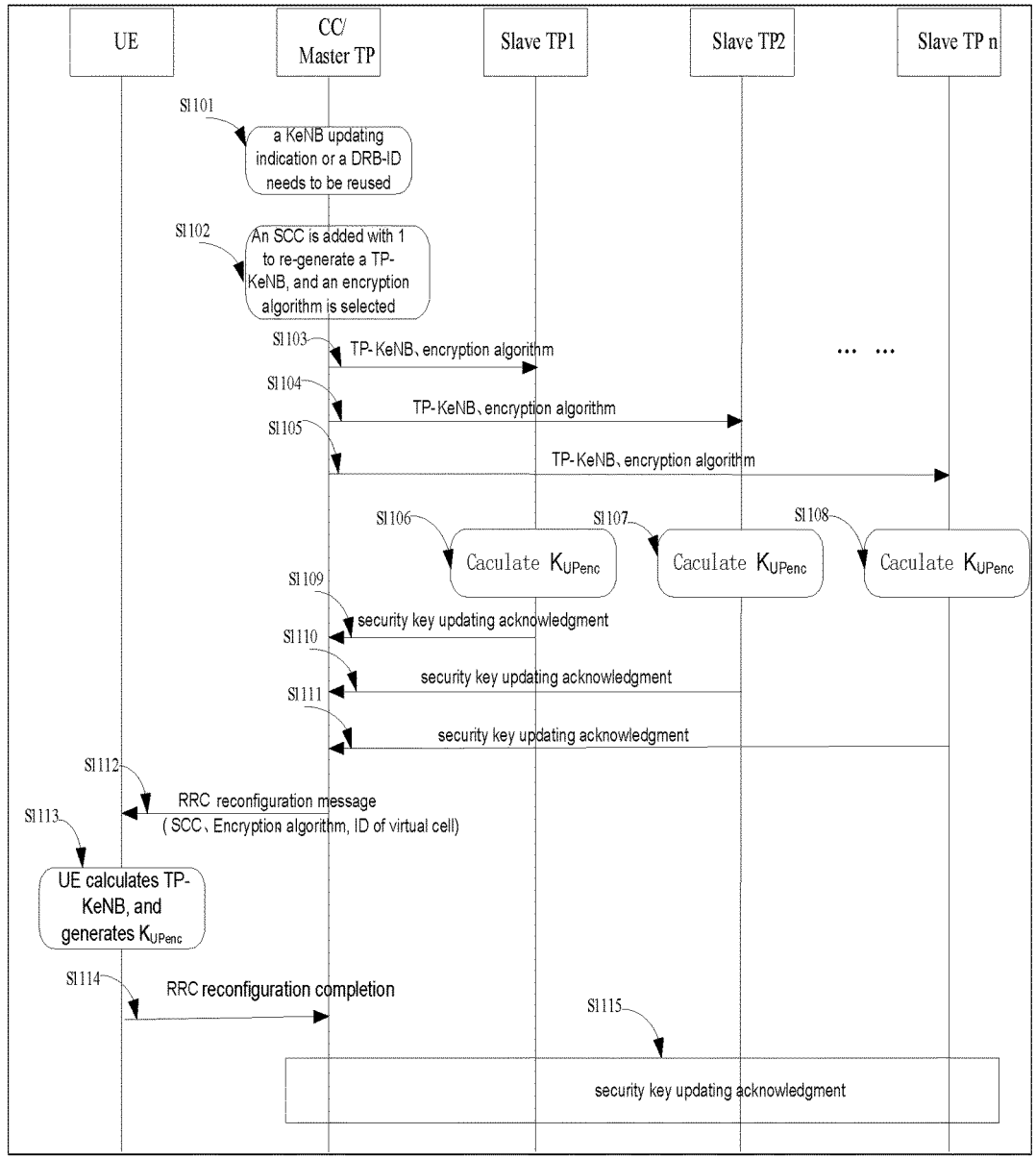
FIG. 11 is a flowchart of a method for updating a key according to a preferable implementation mode 3 of the present invention.

FIG. 11 is a flowchart of a method for updating a key according to a preferable implementation mode 3 of the present invention. As shown in FIG. 11, the method includes the steps as follows.

Step S1101: A Master TP/CC receives an updating indication of a core network KeNB or learns of that a DRB-ID needs to be reused, and a security key updating process is triggered.

Step S1102: The Master TP/CC inputs a KDF to generate a new TP key TP-KeNB according to a new KeNB value, a current value of an SCC added with 1 and an ID of a virtual cell; and the Master TP/CC selects a new encryption algorithm.

Step S1103 to S1105: The Master TP/CC sends a key updating command to Slave TP1, Slave TP2, . . . , Slave TPn respectively, the key updating command containing a newly generated TP key TP-KeNB and a selected encryption algorithm.

Step S1106 to S1108: Slave TP1, Slave TP2, . . . , Slave TPn input KDFs to generate a new encryption key $K_{UPenc}$ according to the received new TP key and encryption algorithm.

Step S1109 to S1111: Slave TP1, Slave TP2, . . . , Slave TPn send security key updating acknowledgment messages to the Master TP after calculation of the encryption key is completed.

Step S1112: After receiving the security key updating acknowledgment messages of all the Slave TPs, the Master TP/CC sends an RRC connecting reconfiguration message to a UE, the message containing a current SCC value, an encryption algorithm and an ID of a virtual cell.

Step S1113: The UE triggers to calculate a TP key TP-KeNB on the basis of the received RRC connecting reconfiguration message, and calculates an encryption key $K_{UPenc}$, the calculation process of the TP key being the same as the process of the Master TP/CC, and the calculation process of the encryption key being the same as the process of the Slave TP.

Step S1114: The UE sends an RRC connecting reconfiguration completion message to the Master TP/CC.

Step S1115: The Master TP/CC sends a security key updating completion acknowledgment message to each Slave TP to acknowledge that a key updating process is completed.

Figure 12:
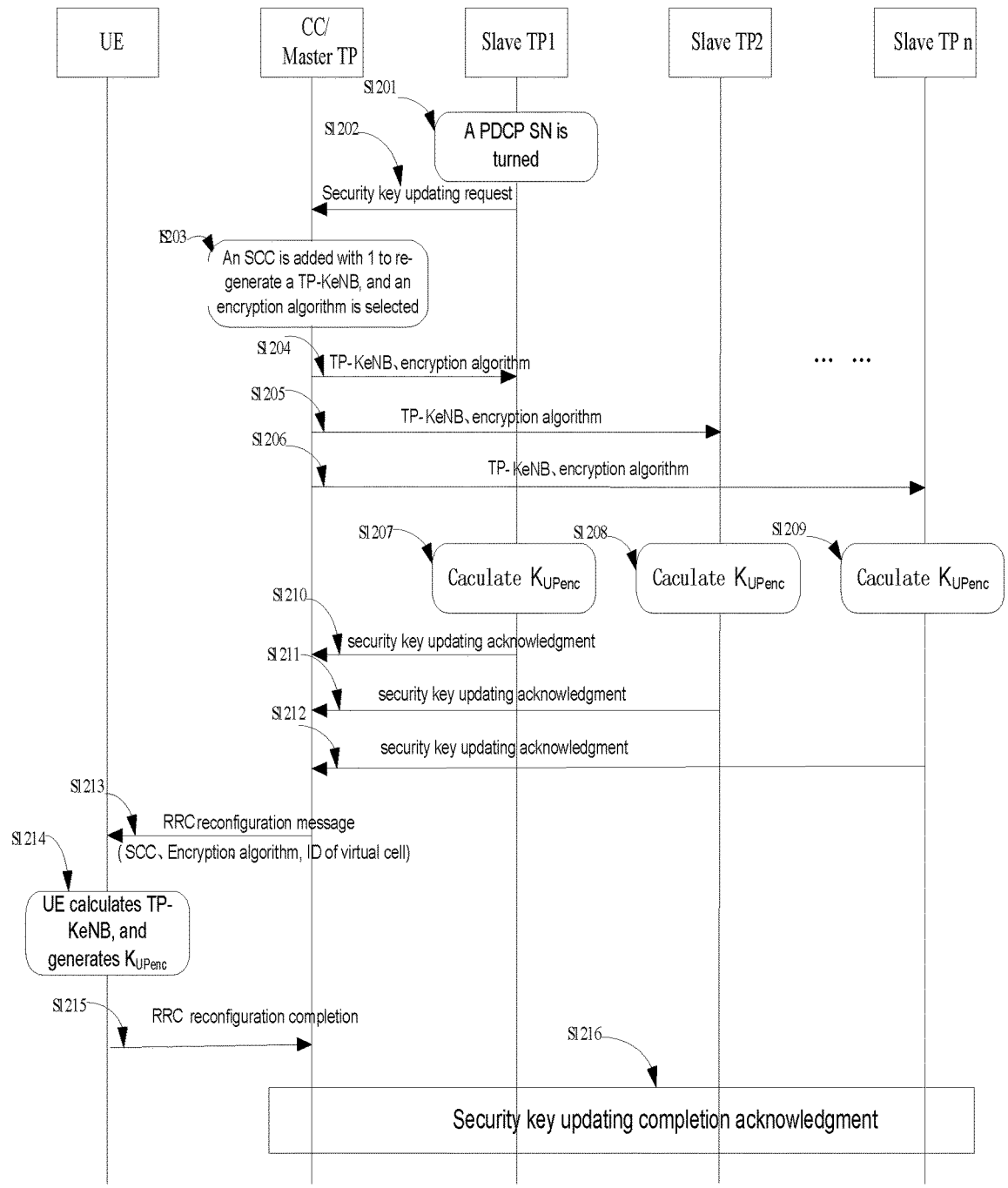
FIG. 12 is a flowchart of a method for updating a key according to a preferable implementation mode 4 of the present invention.

FIG. 12 is a flowchart of a method for updating a key according to a preferable implementation mode 4 of the present invention. As shown in FIG. 12, the method includes the steps as follows.

Step S1201: A PDCP SN of Slave TP1 is turned to trigger a security key updating flow.

Step S1202: Slave TP1 sends a key updating request message to a Master TP/CC.

Step S1203: The Master TP/CC inputs a KDF to generate a new TP key TP-KeNB according to a current KeNB value, a current value of an SCC added with 1 and an ID of a virtual cell; and the Master TP/CC selects a new encryption algorithm.

Step S1204 to S1206: The Master TP/CC sends a key updating command to Slave TP1, Slave TP2, . . . , Slave TPn respectively, the key updating command containing a newly generated TP key TP-KeNB and an encryption algorithm.

Step S1207 to S1209: Slave TP1, Slave TP2, . . . , Slave TPn input KDFs to generate an encryption key $K_{UPenc}$ according to the received new TP key and encryption algorithm.

Step S1210 to S1212: Slave TP1, Slave TP2, . . . , Slave TPn send security key updating acknowledgment messages to the Master TP after calculation of the encryption key is completed.

Step S1213: After receiving the security key updating acknowledgment messages of all the Slave TPs, the Master TP/CC sends an RRC connecting reconfiguration message to a UE, the message containing a current SCC value, an encryption algorithm and an ID of a virtual cell.

Step S1214: The UE triggers to calculate a TP key TP-KeNB on the basis of the received RRC connecting reconfiguration message, and calculates an encryption key $K_{UPenc}$, the calculation process of the TP key being the same as the process of the Master TP/CC, and the calculation process of the encryption key being the same as the process of the Slave TP.

Step S1215: The UE sends an RRC connecting reconfiguration completion message to the Master TP/CC.

Step S1216: The Master TP/CC sends a security key updating completion acknowledgment message to each Slave TP to acknowledge that a key updating process is completed.

INDUSTRIAL APPLICABILITY from the foregoing, it can be seen that the embodiment of the present invention solves the problem about key updating of different TPs in a virtual cell under an UDN scenario, thus achieving the effect of key unification.

Obviously, a person skilled in the art shall understand that all of the above-mentioned modules or steps in the present invention may be implemented by using a general calculation device, may be centralized on a single calculation device or may be distributed on a network composed of a plurality of calculation devices. Alternatively, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the present invention is not limited to the combination of any specific hardware and software.

The above is only the preferred embodiments of the present invention, and not intended to limit the present invention. There may be various modifications and variations in the present invention for those skilled in the art. Any modifications, equivalent replacements, improvements and the like made within the spirit and principle of the present invention shall fall within the scope of protection of the present invention.

What is claimed is:

1. A method for updating a key, comprising:
receiving a key parameter for generating a data encryption key of a Transmission Point (TP) in a virtual cell of a Ultra-dense network; and
generating the data encryption key of the TP in the virtual cell according to the key parameter and a cell Identity (ID) of the virtual cell;
wherein generating the data encryption key of the TP in the virtual cell according to the key parameter and a cell ID of the virtual cell comprises:
selecting a predetermined encryption algorithm;
generating a first key of a master TP in the virtual cell of the Ultra-dense network by using the key parameter and the cell ID of the virtual cell as input parameters; and
sending the predetermined encryption algorithm and the first key to a slave TP in the virtual cell of the Ultra-dense network,
wherein the predetermined encryption algorithm and the first key being used for generating data encryption keys of the master TP and the slave TP,
wherein after the data encryption key of the TP in the virtual cell is generated according to the key parameter and the cell ID of the virtual cell, the method further comprises:
receiving a key updating completion signal from the slave TP; and
sending a Radio Resource Control (RRC) connecting reconfiguration message to a User Equipment (UE), the RRC connecting reconfiguration message carrying information for generating the data encryption key of the TP in the virtual cell.

2. The method as claimed in claim 1, wherein the key parameter for generating the key of the TP in the virtual cell is received by satisfying one of the following trigger conditions:
receiving an updating signal from a core network, the updating signal carrying the key parameter;
receiving a reusability signal of a Data Radio Bearer-Identity (DRB-ID) from the core network; and
receiving a turning signal of a Packet Data Convergence Protocol Sequence Number (PDCPSN) from the TP.

3. The method as claimed in claim 2, further comprising:
transmitting data according to the data encryption key.

4. The method as claimed in claim 1, further comprising: transmitting data according to the data encryption key.

5. The method as claimed in claim 1, further comprising: transmitting data according to the data encryption key.

6. A device for updating a key, which comprise a hardware processor and a memory, and the hardware processor is configured to execute program modules/units stored in the memory, and the program modules/units comprises:
  a first receiving module, configured to receive a key parameter for generating a data encryption key of a Transmission Point (TP) in a virtual cell of a Ultra-dense network; and
  a generation module, configured to generate the data encryption key of the TP in the virtual cell according to the key parameter and a cell Identity (ID) of the virtual cell;
  wherein the generation module comprises:
  a selection unit, configured to select a predetermined encryption algorithm;
  a generation unit, configured to generate a first key of a master TP in the virtual cell of the Ultra-dense network by using the key parameter and the cell ID of the virtual cell as input parameters; and
  a sending unit, configured to send the predetermined encryption algorithm and the first key to a slave TP the virtual cell of the Ultra-dense network,
  the predetermined encryption algorithm and the first key being used for generating data encryption keys of the master TP and the slave TP, wherein the program modules further comprise:
  a second receiving module, configured to receive a key updating completion signal from the slave TP; and
  a sending module, configured to send a Radio Resource Control (RRC) connecting reconfiguration message to a User Equipment (UE), the RRC connecting reconfiguration message carrying information for generating the data encryption key of the TP in the virtual cell.

7. The device as claimed in claim 6, wherein the first receiving module is further configured to receive the key parameter for generating the key of the TP in the virtual cell by satisfying one of the following trigger conditions:
  receiving an updating signal from a core network, the updating signal carrying the key parameter;
  receiving a reusability signal of a Data Radio Bearer-Identity (DRB-ID) from the core network; and
  receiving a turning signal of a Packet Data Convergence Protocol Sequence Number (PDCPSN) from the TP.

8. The device as claimed in claim 7, further comprising:
  a data transmission module, configured to transmit data according to the data encryption key.

9. The device as claimed in claim 6, the program modules further comprising:
  a data transmission module, configured to transmit data according to the data encryption key.

10. The device as claimed in claim 6, further comprising:
  a data transmission module, configured to transmit data according to the data encryption key.

* * * * *